United States Patent Office 2,884,311
Patented Apr. 28, 1959

2,884,311

PRODUCTION OF ALKALI METAL HYDRIDES

George F. Huff, Pittsburgh, Pa., assignor to Callery Chemical Company, Pittsburgh, Pa., a corporation of Pennsylvania No Drawing. Application December 16, 1953
Serial No. 398,610

5 Claims. (Cl. 23—204)

This invention relates to the production of alkali metal hydrides, and more especially sodium hydride (NaH).

The alkaline earth metals combine with hydrogen with great rapidity on heating to a few hundred degrees centigrade. Queerly enough, although the alkali metals are generally more reactive than the alkaline earth metals, their absorption of hydrogen is slow so that special methods of preparation of their hydrides are necessary. Commonly, the alkali metal is vaporized or dispersed in the form of very fine particles for this reaction. Such dispersions are usually formed in an inert liquid medium, such as molten paraffin or kerosene, through which hydrogen is passed. Sodium presents a particular problem in that sodium hydride is a solid at the usual reaction temperatures, e.g., 200° to 400° C., so that the hydride tends to form a film over the sodium metal and thus impede or prevent further reaction. The common practice is to form a fine dispersion of sodium in a suitable liquid or liquefied hydrocarbon and to hydrogenate under high hydrogen pressure. Another expedient is to disperse liquid sodium over preformed sodium hydride prior to the hydrogenation. Obviously, simpler and more readily applied procedures would be desirable for commercial operations.

It is among the objects of this invention to provide a simple, readily practiced and efficient method of producing alkali metal hydrides that avoids the troubles and disadvantages of prior practices and makes use of inexpensive and readily available reactants.

A further object is to provide such a method that is especially applicable to the production of sodium hydride.

Other objects will appear from the following specification.

I have discovered, and it is upon this that the invention is in large part predicated, that the alkali metal hydrides may be produced easily by subjecting a mixture of the alkali metal carbonate and carbon to an elevated temperature while contacting the mixture with hydrogen. Preferably the carbonate and the carbon, suitably in the form of coke, are finely divided, and they should, of course, be intimately mixed.

In general, higher temperatures are required for this reaction than are applied in the previously known methods of producing alkali metal hydrides. The use of high hydrogen pressure is avoided in this method but for most purposes it is preferred to pass a current of hydrogen into contact with the highly heated mixture at a rate such as to carry the reaction products away from the mixture for deposition of the hydride beyond the reaction zone.

The reaction is represented by the following equation in which M represents an alkali metal:

$$M_2CO_3 + 2C + H_2 = 2MH + 3CO$$

Although the reaction proceeds satisfactorily using stoichiometric proportions of alkali metal carbonate and carbon, it is preferred to have a slight excess of carbon. Where a current of hydrogen is used as just described, there is applied, of course, a large excess of hydrogen over that required for the reaction but it may be separated from the hydride and other reaction product for recirculation to the furnace.

The invention may be described with further reference to the production of sodium hydride. Stoichiometric quantities of carbon and sodium carbonate were ground together and placed in a nickel container which was centered in the hot zone of a furnace formed of a stainless steel tube mounted within a wire-wound electric resistance furnace. A slow stream of hydrogen was passed through the furnace and the temperature was raised to 900° C. After about 1 hour the furnace was cooled and the tube was opened. The product, NaH, was found in the downstream side of the furnace as pure white needle-like crystals and as a brown powder. The white needles were pyrophoric, burning promptly on contact with air. The brown powder was somewhat less reactive but it also inflamed in contact with moist air or when dropped into water. This reaction requires a temperature of at least 600° C., and it proceeds best at 850° C. or higher.

Carbon monoxide is a by-product of the method of this reaction, and it may be used as a fuel for heating the reaction furnace.

Although the invention has been described with particular reference to the production of sodium hydride, it is equally applicable to the production of the other alkali metal hydrides. Where the hydrides formed are reactive in air, they may be recovered by introducing an inert hydrocarbon liquid, such as kerosene or molten paraffin, which protects the hydride from the atmosphere and thus serves as a protective medium until the hydride is to be used.

According to the provisions of the patent statutes, I have explained the principle and mode of practicing my invention and have described what I now consider to represent its best embodiment. However, I desire to have it understood that, within the scope of the appended claims, the invention may be practiced otherwise than as specifically described.

I claim:

1. That method of making an alkali metal hydride which comprises heating a mixture of finely divided alkali metal carbonate and finely divided carbon to an elevated temperature in an atmosphere of hydrogen, and recovering the alkali metal hydride formed.

2. That method of making an alkali metal hydride which comprises heating a mixture of finely divided alkali metal carbonate and finely divided carbon to at least about 600° C., and passing a current of hydrogen into contact with the mixture, and recovering the alkali metal hydride formed, said carbon being present in small excess and said hydrogen being present in large excess over the stoichiometric requirements of the reaction.

3. A method according to claim 2, said carbonate being $Na_2CO_3$, and said hydride being NaH.

4. A method according to claim 3, the reaction being effected at a temperature of at least about 850° C.

5. That method of making an alkali metal hydride which comprises heating a mixture of finely divided alkali metal carbonate and finely divided carbon to an elevated temperature and passing a current of hydrogen into contact with the mixture at a rate to carry reaction product away from the mixture, and recovering the alkali metal hydride formed, said carbon being present in small excess and said hydrogen being present in large excess over the stoichiometric requirements of the reaction.

No references cited.